United States Patent
Otenko (10) Patent No.: US 8,522,216 B2
(45) Date of Patent: Aug. 27, 2013

(54) MEMORY LEAK DETECTION

(75) Inventor: Oleksandr Otenko, Wokingham (GB)

(73) Assignee: Oracle International Corporation, Redwood Shores, CA (US)

( * ) Notice: Subject to any disclaimer, the term of this patent is extended or adjusted under 35 U.S.C. 154(b) by 632 days.

(21) Appl. No.: 12/773,211

(22) Filed: May 4, 2010

(65) Prior Publication Data

US 2011/0276949 A1   Nov. 10, 2011

(51) Int. Cl.
*G06F 9/44* (2006.01)

(52) U.S. Cl.
USPC .......................................... 717/127; 717/131

(58) Field of Classification Search
USPC ................................. 717/127, 131
See application file for complete search history.

(56) References Cited

U.S. PATENT DOCUMENTS

| | | | |
|---|---|---|---|
| 6,393,439 B1 | 5/2002 | Houldsworth et al. |
| 6,401,182 B1 | 6/2002 | Sweeney |
| 6,804,691 B2 | 10/2004 | Coha et al. |
| 6,804,961 B2 | 10/2004 | Lumpkin |
| 7,237,085 B2 | 6/2007 | Sexton et al. |
| 7,389,395 B1 | 6/2008 | Garthwaite et al. |
| 7,478,156 B1 | 1/2009 | Pereira |
| 7,509,338 B1 | 3/2009 | Tarditi |
| 7,950,004 B2 | 5/2011 | Vieira et al. |
| 8,229,726 B1 | 7/2012 | Magdon-Ismail et al. |
| 2004/0133759 A1 | 7/2004 | Sekiguchi |
| 2004/0193828 A1 | 9/2004 | Nevill |
| 2005/0033781 A1 | 2/2005 | Dussud |
| 2006/0265438 A1 | 11/2006 | Shankar et al. |
| 2007/0255775 A1* | 11/2007 | Manolov et al. .............. 707/206 |
| 2009/0327373 A1 | 12/2009 | Chacko et al. |
| 2009/0328007 A1 | 12/2009 | Chen et al. |
| 2010/0192133 A1 | 7/2010 | Brady |
| 2010/0205230 A1 | 8/2010 | Simeonov et al. |
| 2010/0205674 A1 | 8/2010 | Zorn et al. |
| 2010/0211754 A1 | 8/2010 | Crosby et al. |
| 2010/0229159 A1 | 9/2010 | Odaira et al. |
| 2010/0287538 A1 | 11/2010 | Soundararajan et al. |
| 2011/0029822 A1 | 2/2011 | Moser |
| 2011/0107877 A2 | 5/2011 | Seal |
| 2011/0276833 A1 | 11/2011 | Otenko |

OTHER PUBLICATIONS

U.S. Appl. No. 12/773,203, filed May 4, 2010, Office Action mailed Jun. 13, 2012, 14 pages.
U.S. Appl. No. 12/773,203, filed May 4, 2010, Final Office Action mailed Jan. 23, 2013, 11 pages.
U.S. Appl. No. 12/773,203, filed May 4, 2010, Notice of Allowance mailed Apr. 4, 2013, 19 pages.

\* cited by examiner

*Primary Examiner* — Wei Zhen
*Assistant Examiner* — Lanny Ung
(74) *Attorney, Agent, or Firm* — Kilpatrick Townsend & Stockton LLP (57) ABSTRACT

Embodiments of the invention provide systems and methods for detecting an analyzing memory leaks. According to one embodiment, a method of detecting a memory leak can comprise collecting instance count data for a number of instances of a plurality of classes in a memory heap. A correlation coefficient can be calculated for each of the plurality of classes in the memory heap. The correlation coefficient can represent a relevance of the class to a growth of the memory heap. Classes contributing to the growth of the memory heap can then be identified based on the correlation coefficient.

21 Claims, 5 Drawing Sheets

MEMORY LEAK DETECTION

CROSS-REFERENCES TO RELATED APPLICATIONS

The present application is related to U.S. patent application Ser. No. 12/773,203 entitled "Statistical Analysis of Heap Dynamics for Memory Leak Investigations" which is filed concurrently herewith and incorporated herein by reference for all purposes.

BACKGROUND OF THE INVENTION

Embodiments of the present invention relate generally to methods and systems for debugging or troubleshooting a computer program and more particularly to detecting a memory leak caused by an application.

Memory leaks are a common problem that occurs because of errors in software code. It can be described as a problem of the software program being unable to reuse the memory that it does not need anymore. A typical case is that the software error prevents the memory the program has previously obtained from the memory manager and does not need anymore, from being returned to the memory manager. For example, an application may allocate memory for a particular object, data structure, etc. but then, due to an error, fail to deallocate this memory. Over time, with many iterations of the application, such errors can create a growth in the size of a memory heap used by the application and, correspondingly, a decrease in the memory available for use by the application.

In order to identify and correct these errors, a memory leak analysis can be performed on an application, for example during debugging or troubleshooting of the application. Existing tools for performing memory leak analysis, so called memory profilers, allow for monitoring of the memory to help find the objects that grow, and locate the referrers of those objects. Then, determining the failing code path related to these objects is done manually. Typically, the memory profile collects a heap dump, i.e., takes a snapshot of the memory used by an application at a particular instant in time. Several memory profiler software tools exist on the market which simplify the task by analyzing a heap dump where it is possible to inspect the references between the objects that existed in memory at the time of collection of the heap dump. Certain algorithms exist for automating such a heap analysis. For example, some tools can compare two heap dumps to find the differences, which can then be attributed to memory leaks. The investigation of the memory leak would then normally start with the area of memory that can be seen accumulating the most objects.

The drawbacks of either of this analysis stem from an inability to monitor the heap at run time, so that only one or two heap dumps corresponding to two points in the program's life, can be analyzed. This often provides false positives—some areas are determined to be growing, whereas the growth can be proven to be transient. With the size of memory being in hundreds of megabytes and the program constantly allocating and deallocating memory during its operation, this becomes a very difficult task for a human, especially when monitoring live running programs. Additionally, the memory leak is rarely caused by a single software problem; there usually is a superposition of problems that cause the memory leak to occur. This complicates manual analysis even further. Hence, there is a need for improved methods and systems for detecting and analyzing memory leaks.

BRIEF SUMMARY OF THE INVENTION

Embodiments of the invention provide systems and methods for detecting and analyzing memory leaks. According to one embodiment, a method of detecting a memory leak can comprise collecting instance count data for a number of instances of a plurality of classes in a memory heap. For example, collecting instance count data for the instances of the plurality of classes can comprise collecting class histograms for each of the plurality of classes. Such class histograms can include but are not limited to a list of names of the classes of the plurality of classes, counts of instances of each class, cumulative memory size used by each of the classes, and total memory used. In some cases, collecting instance count data for the instances of the plurality of classes in the memory heap can comprise collecting three or more class histograms for each class dynamically during execution of an application creating the instances.

A correlation coefficient can be calculated for each of the plurality of classes in the memory heap. The correlation coefficient can represent a relevance of the class to a growth of the memory heap. Calculating the correlation coefficient can comprise initializing mean instance size and instance count values for each class, calculating the mean instance size for each class, and accumulating the instance count for each class. The correlation coefficient can be calculated for each class based on the mean instance size of each class, the instance count and a total size of the heap.

Classes contributing to the growth of the memory heap can then be identified based on the correlation coefficient. In some cases, the correlation coefficient of each class can have a value between $-1.0$ and $+1.0$. In such cases, identifying classes contributing to the growth of the memory heap can comprise identifying those classes having a correlation coefficient of approximately $+1.0$ and referenced by a subset of root objects having a correlation coefficient that is significantly smaller than $+1.0$.

According to another embodiment, a system can comprise a processor and a memory communicatively coupled with and readable by the processor. The memory can have stored therein a series of instructions which, when executed by the processor, cause the processor to detect a memory leak by collecting instance count data for a number of instances of a plurality of classes in a memory heap, calculating a correlation coefficient for a class of each of the plurality of classes in the memory heap, the correlation coefficient representing a relevance of the class to a growth of the memory heap, and identifying classes contributing to the growth of the memory heap based on the correlation coefficient.

For example, collecting instance count data for the plurality of classes can comprise collecting class histograms for each of the plurality of classes. Such class histograms can include but are not limited to a list of names of the classes of the plurality of classes, counts of instances of each class, cumulative memory size used by each of the classes, and total memory used. In some cases, collecting instance count data for the instances of the plurality of classes in the memory heap can comprise collecting three or more class histograms for each class dynamically during execution of an application creating the instances. In some cases, collecting instance count data for the instances of the plurality of classes in the memory heap can comprise collecting three or more class histograms for each class dynamically during execution of an application creating the instances.

Calculating the correlation coefficient can comprise initializing mean instance size and instance count values for each class, calculating the mean instance size for each class, and accumulating the instance count for each class. The correlation coefficient can be calculated for each class based on the mean instance size of each class, the instance count and a total size of the heap. In some cases, the correlation coefficient of each class can have a value between −1.0 and +1.0. In such cases, identifying classes contributing to the growth of the memory heap can comprise identifying those classes having a correlation coefficient of approximately +1.0 and referenced by a subset of root objects having a correlation coefficient that is significantly smaller than +1.0.

According to yet another embodiment, a machine-readable medium can have stored thereon a series of instructions which, when executed by a processor, cause the processor to detect a memory leak by collecting instance count data for a number of instances of a plurality of classes in a memory heap. A correlation coefficient can be calculated for each of the plurality of classes in the memory heap. The correlation coefficient can represent a relevance of the class to a growth of the memory heap. Classes contributing to the growth of the memory heap can then be identified based on the correlation coefficient.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for memory leak detection. More specifically, embodiments of the present invention provide for statistical analysis of heap dynamics in order to detect and determine the causes of a memory leak. Embodiments of the present invention can be applied to any software program or apparatus where memory state can be described by a set of attributes at several points in time. In one embodiment, one or more series of so called class histograms such as produced by the Java Virtual Machine can be collected upon request. These class histograms can consist of a list of the names of the classes loaded by Java Virtual Machine or other environment, counts of instances of objects of each such class, cumulative memory size taken by these objects, and the total memory taken by all the objects that have not been deallocated yet. A correlation between the instance counts and the total memory, or between the cumulative instance size and the total memory can be calculated. The strength of the correlation can be expressed as a correlation coefficient. The instances of classes whose correlation coefficient indicates a strong relation to the total can be considered leaking if the dominating trend of the total can be seen growing. It is also possible to perform correlational analysis between instances of any given class and instances of other classes to help determine common code paths and narrow down the search for software errors causing the observed allocation trends. Such an analysis can be performed, for example, according to the methods and systems described in the Related Application entitled "Statistical Analysis of Heap Dynamics for Memory Leak Investigations" cited above and incorporated herein by reference.

To provide for collection of data that is representative of the memory leak pattern, two methods for collecting the data are described. In one case, the class histograms can be collected after every iteration a certain execution flow is repeated by the program. In this case, the execution flow under investigation should be sequential, as with the parallel execution flow it is difficult at best to determine the end of the flow. One example of such flow would be a stress test environment, where a certain operation is repeatedly executed by the program being tested in order to expose the errors in the program implementation. In another case, the class histograms can be collected periodically, for example at some uniformly distributed time intervals. This allows to analyse programs repeatedly executing the same flow concurrently. One example of such flow would be a web server processing multiple similar concurrent requests. It is feasible that other useful applications of these embodiments exist, so long that the data collected for the statistical analysis is representative of the execution flow being analysed. In one implementation the class histograms can be saved to a file for analysis. In another embodiment the class histograms can be obtained and analyzed by a diagnostic module of the application or a Java Virtual Machine during the program's execution.

Stated another way, detecting a memory leak can comprise collecting instance count data for a number of instances of a plurality of classes in a memory heap. For example, collecting instance count data for the instances of the plurality of classes can comprise collecting class histograms for each of the plurality of classes. Such class histograms can include but are not limited to a list of names of the classes of the plurality of classes, counts of instances of each class, cumulative memory size used by each of the classes, and total memory used. In some cases, collecting instance count data for the instances of the plurality of classes in the memory heap can comprise collecting two or more class histograms for each class dynamically during execution of an application creating the instances.

A correlation coefficient can be calculated for a class of each of the plurality of classes in the memory heap. The correlation coefficient can represent a relevance of the class to a growth of the memory heap. Calculating the correlation coefficient can comprise initializing mean instance size and instance count values for each class, calculating the mean instance size for each class, and accumulating the instance count for each class. The correlation coefficient can be calculated for each class based on the mean instance size of each class, the instance count and a total size of the heap.

Classes contributing to the growth of the memory heap can then be identified based on the correlation coefficient. In some cases, the correlation coefficient of each class can have a value between −1.0 and +1.0. In such cases, identifying classes contributing to the growth of the memory heap can comprise identifying those classes having a correlation coefficient of approximately +1.0 and referenced by a subset of root objects having a correlation coefficient that is significantly smaller than +1.0. Various additional details of embodiments of the present invention will be described below with reference to the figures.

Figure 1:
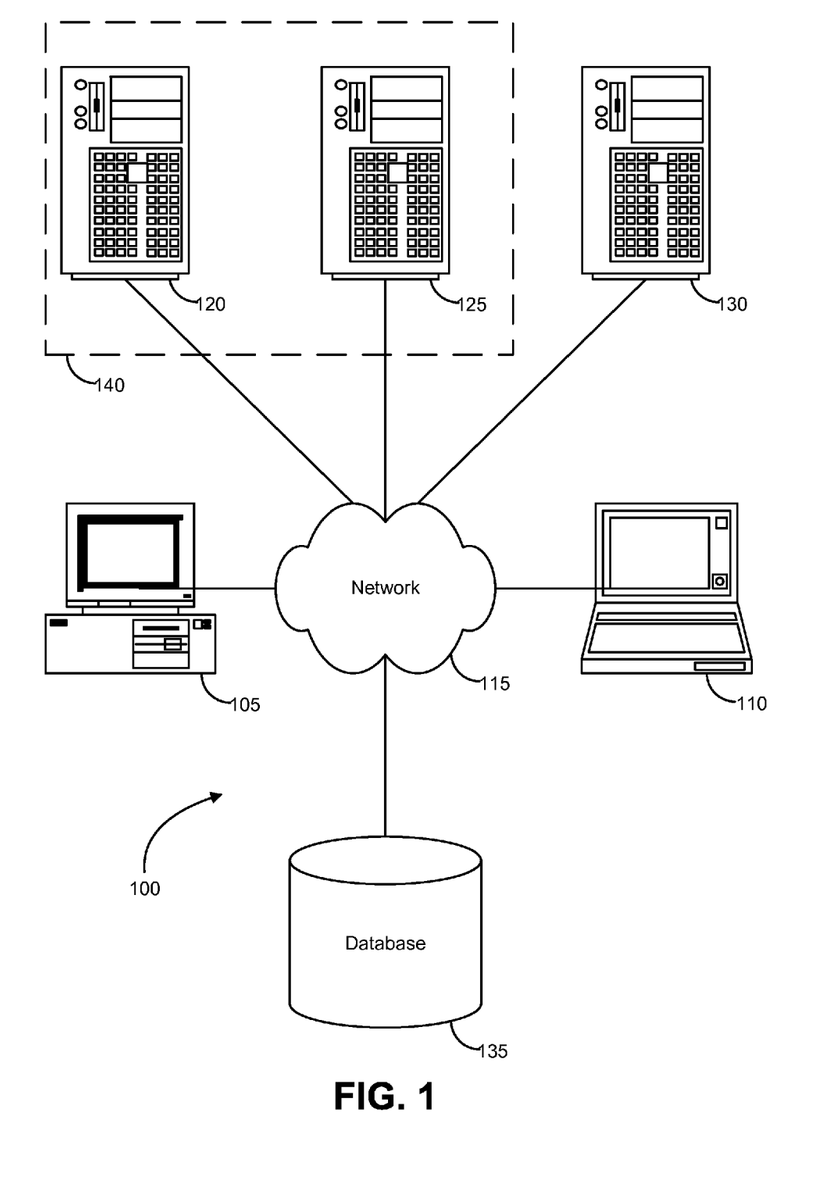
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers, rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
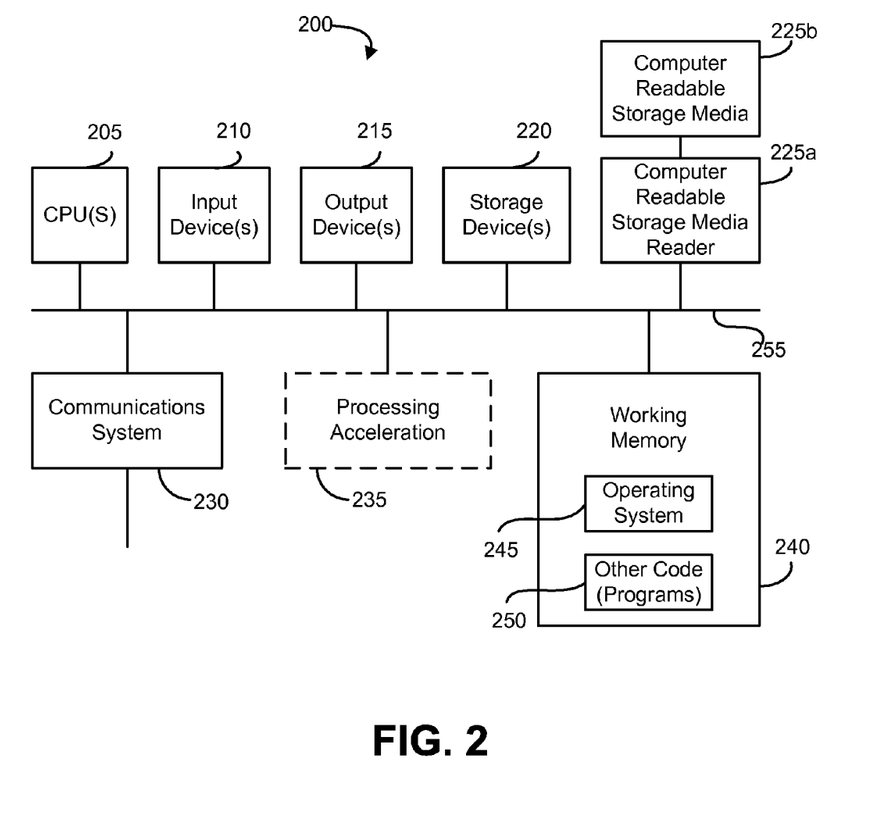
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the present invention provide for statistical analysis of heap dynamics in order to detect and determine the causes of a memory leak. That is, trend analysis can be used to detect a memory leak problem. For example, in an execution environment with a memory leak present, the total memory consumption of a program will grow. Under such circumstances the trends of the instance counts of the classes that are not leaking will be dissimilar to the trend of the total memory consumption, because their instance counts and memory footprint will be statistically stable. On the contrary, the instance counts of the classes participating in the memory leak will be increasing, hence the trend of the instance counts and memory footprint will be more similar to the trend of the total memory consumption. According to one embodiment, the trends of instance allocations within a memory heap and the trend of the total memory consumption can be compared using Pearson's product-moment correlation coefficient as a measure of similarity of the trends. However, it should be understood that, depending upon the exact implementation, it is possible to use other measures to compare the trends. These other measures and methods for comparing trends are also considered to be within the scope of the present invention.

Figure 3:
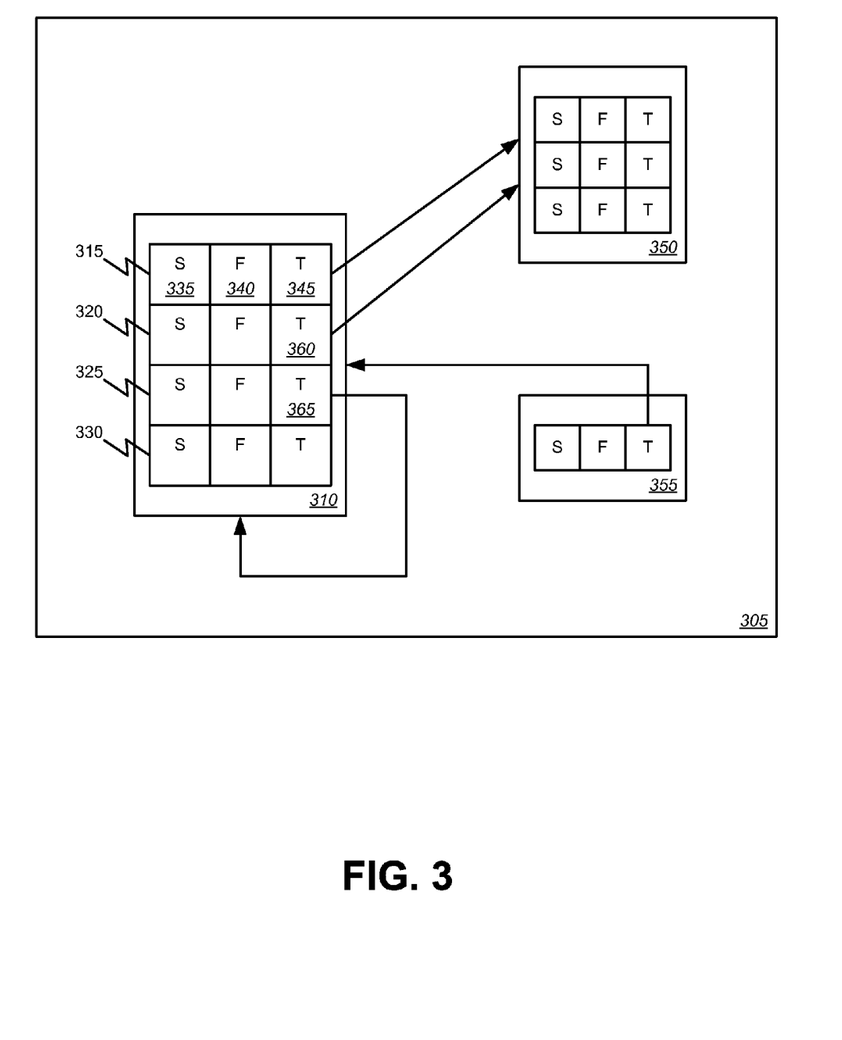
FIG. 3 is a block diagram illustrating a conceptual view of a memory heap according to one embodiment of the present invention.

FIG. 3 is a block diagram illustrating a conceptual view of a memory heap according to one embodiment of the present invention. In this example, the memory heap 305 can have stored therein a number of objects 310, 350, and 355. Each object 310, 350, and 355 can have one or more references 315-330 to none (like 330), one or more other instances, in some cases even referencing itself or having references to itself (like 325 and 355). It should be understood that, while illustrated here with relatively few objects 310, 350, and 355 and references 315-330 for the sake of simplicity and clarity, in actual implementations the memory heap 305 likely contains very large numbers of objects with any number of references to numerous other instances. Regardless of the number of Objects 310, 350, and 355 and instances 315-330, each instance 315-330 can include a representation 335 of a referrer instance (S), a representation 340 of the field in the referrer (F), and a representation 345 of a referent instance (T). Thus, according to one embodiment, the heap 305 can be modeled as a collection of links (SFT) which can be used to look for trends in changes in the links of similar types, i.e., pointing from instances of a same class S to an instance of same class T through a same field F in S. It should be understood that the representation 335 of the referrer instance (S) and the representation 340 of the field in the referrer (F) usually don't take space on the heap but are logical identifiers: the representation 335 of the referrer instance (S) can be the address of the vector of the representation 340 of the field in the referrer (F), and the representation 340 of the field in the referrer (F) can be a position of an element in that vector or the offset of the field within the object 310, counting from the representation 335 of the referrer instance (S). According to one embodiment, the representation 335 of the referrer instance (S) can be joined with the representation 340 of the field in the referrer (F) and each representation 345 of a referent instance (T) in the model of the heap to form a basis of the traversal or analysis algorithms explained further below.

In other words, let several memory heap instances ($H_i$) be available. Let each memory heap instance 315-330 be represented by a set of unique tuples $H_i=\{<S,F,T>\}$, where S is the referrer instance, F is the field in the referrer, and T is the referent instance. Each referent can be a referrer in some other tuple, and each referrer can be a referent in some other tuple. Some referrers are not referenced from any other tuple, and in this model they can be considered roots of the heap. Some roots of the heap have references to them. Without loss of generality, we do not model garbage instances (i.e., those that are not reachable from heap roots). Let each instance be assigned to a class, so that several instances of a single class may exist in some tuples in the heap. Let a set of classes considered growing, G, be available. Let a set of classes considered collections, C, be available. If S is an instance and G is a set of classes, the notation S∈G can mean that an instance S belongs to a class that is in set G.

An instance in the heap can be considered a growth root if the count of instances of the same class does not change, but which references instances whose count increases. A conclusion from this definition can be that in order for the growth to occur the number of references (SFT tuples) grows without increasing the number of referrers (same S in some or all of those tuples). For example, in Java all instances have fixed size. So, statistically significant growth occurs when arrays are used to store the references, or an instance of a so-called collection class is used. There simply is no other way to increase the number of references without changing the number of referrers. The arrays also have fixed size, but new bigger ones can be allocated to copy the contents of the existing array, and the old array can then be garbage-collected. Thus, the instance count of arrays remains relatively static but the number of references that can be stored in the arrays can increase.

The instances of collection classes can form dynamically linked structures, like stacks, queues, lists, trees and others. In order to store more references than can already be stored in the collection instance, new collection instances can be created. The growth in the number of collection instances can be growing, if they reference instances that grow. Therefore, a distinction should be made of the growth of the collection instances purely to obtain more intuitive results quicker. Without this distinction, more heap instances may be needed to discount transient collection instance growths that naturally occur during the program's life without a cause for concern.

As noted above, detecting a memory leak can comprise collecting instance count data for a number of instances of a plurality of objects in a memory heap. For example, collecting instance count data for the instances of the plurality of objects can comprise collecting one or more series of so called class histograms such as produced by the Java Virtual Machine can be collected upon request. These class histograms can consist of a list of the names of the classes loaded by Java Virtual Machine or other environment, counts of instances of objects of each such class, cumulative memory size taken by these objects, and the total memory taken by all the objects that have not been deallocated yet. A correlation between the instance counts and the total memory, or between the cumulative instance size and the total memory can be calculated. The strength of the correlation can be expressed as a correlation coefficient. The instances of classes whose correlation coefficient indicates a strong relation to the total can be considered leaking if the dominating trend of the total can be seen growing.

The class histograms can be collected in many ways in order to provide representativeness of the input data. In cases when the process under investigation can be executed repeatedly and sequentially, the histograms can be collected after every iteration. The data collected this way may have less "fuzz" caused by transient memory allocations that last only for the duration of a single iteration. In cases when the process cannot be executed sequentially, it is possible to collect class histograms at distributed points in time. The data collected this way may contain fluctuations for some transient allocations that last only for the duration of a single process in a single thread of execution, but truly transient allocations will be relatively constant and do not affect the accuracy of the results.

In other words, a human or automatic investigator can collect class histograms representative of the process causing a memory leak. The input to a leak detection process as described here can be a set of k histograms that consist of instance counts for class j $C_{kj}$, cumulative instance sizes for class j $S_{kj}$, and the total memory consumption of the program $T_k$. The output of the process can be a set of correlation coefficients for class j $X_j$. The correlation coefficients $X_j$ can be used to sort classes by relevancy to the observed total memory consumption change. The investigation can be focused on determining the cause and the location of the growth observed for the instances of the highly relevant classes, which are the classes with the correlation coefficient close to +1.0 in one embodiment. It should be noted that some Java Virtual Machines report the cumulative size with coarse precision; in such cases instance counts $C_{kj}$ should be used instead of instance sizes $S_{kj}$ in the following algorithm. This provides similar accuracy of the result for classes whose instance size is constant (hence $C_{kj}$ is proportionate to $S_{kj}$)—this is true for all classes but arrays, as arrays can change their size without changing the instance count. In some languages changing the size of the array means the application allocates a new array of the needed size, thus temporarily increasing the number of array instances, copies (part of) an existing array, and deallocates the array it doesn't need anymore, which brings the count of array instances back to the original.

Figure 4:
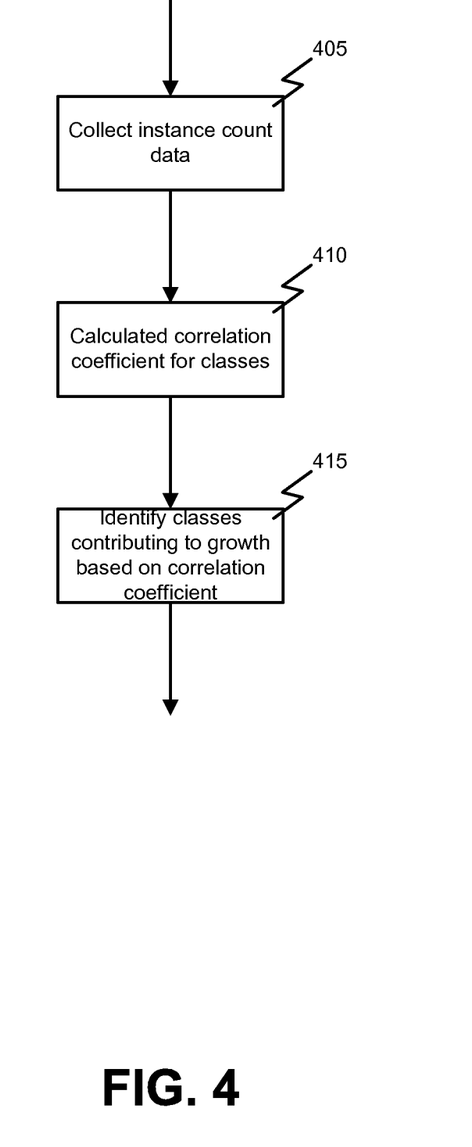
FIG. 4 is a flowchart illustrating a process for memory leak detection according to one embodiment of the present invention.

FIG. 4 is a flowchart illustrating a process for memory leak detection according to one embodiment of the present invention. In this example, the process can begin with collecting 405 instance count data for a number of instances of a plurality of classes in a memory heap. For example, collecting 405 instance count data for the instances of the plurality of classes can comprise sequentially or periodically collecting class histograms for each of the plurality of classes. As noted above, such class histograms can include but are not limited to a list of names of the classes of the plurality of classes, counts of instances of each class, cumulative memory size used by the instances of each of the classes, and total memory used. In some cases, collecting instance count data for the instances of the plurality of classes in the memory heap can comprise collecting two or more class histograms for each class dynamically during execution of an application creating the instances.

A correlation coefficient can be calculated 410 for a class of each of the plurality of classes in the memory heap. The correlation coefficient can represent a relevance of the class to a growth of the memory heap. As noted above, the trends of instance allocations within a memory heap and the trend of the total memory consumption can be compared using Pearson's product-moment correlation coefficient as a measure of similarity of the trends. An exemplary process for performing such calculations will be described in greater detail below with reference to FIG. 5.

Classes contributing to the growth of the memory heap can then be identified 415 based on the correlation coefficient. In some cases, the correlation coefficient of each class can have a value between −1.0 and +1.0. In such cases, identifying 415 classes contributing to the growth of the memory heap can comprise identifying those classes having a correlation coefficient of approximately +1.0 and referenced by a subset of root objects having a correlation coefficient that is significantly smaller than +1.0, e.g., below +0.5, but this threshold can be chosen differently using many heuristics. Thus, the correlation method provides ways to evaluate which coefficients indicate strong correlation, and which don't, usually considered anything below +0.5, but this can depend on the distribution of the classes. Several methods for choosing the right threshold can be used, including but not limited to a plot of correlation coefficients for all classes. A graphical representation of correlation coefficient distribution is one of the simplest ways to determine the threshold value separating classes that should be considered contributing to the growth from those not contributing to the growth.

As noted, trends of instance allocations within a memory heap and the trend of the total memory consumption can be compared using Pearson's product-moment correlation coefficient as a measure of similarity of the trends. The calculation can include computing means of several kinds. It can start with zero values for means and the sample count sc. Then, upon arrival of a class histogram k that consists of instance counts and instance sizes for each class j, $C_{kj}$ and $S_{kj}$ respectively, and the total memory consumption $T_k$, compute:

$$E_j = E_j + S_{kj} \quad\quad 1.$$

$$ET = ET + T_k \quad\quad 2.$$

$$ET_j = ET_j + S_{kj} * T_k \quad\quad 3.$$

$$E2_j = E2_j + S_{kj} * S_{kj} \quad\quad 4.$$

$$ET2 = ET2 + T_k * T_k \quad\quad 5.$$

$$sc = sc + 1 \quad\quad 6.$$

At any given point in time between completing step 6 of the above algorithm and starting step 1 for the next class histogram the correlation coefficients $X_j$ for class j can be computed as:

$$X_j = (sc*ET_j - E_j*ET)/(\text{sqrt}(sc*E2_j - E_j*E_j) * \text{sqrt}(sc*ET2 - ET*ET))$$

where sqrt is the function computing square root of the given expression. If either of the terms in the denominator is zero for any of $X_j$, assume the value of $X_j$ is zero. As a result, $X_j$ will have a value between −1.0 and +1.0. Classes whose $X_j$ is close to +1.0 can be considered following the trend of the total memory consumption very well if the number of histograms processed this way is representative. In other words, $E_j$ is a multiple of mean for class j (counts or memory size), i.e., class count divided by the number of histograms processed. Similarly $E2_j$ is the multiple of the mean of the square, $ET_j$ is a product of class j and Total (used to compute covariance), ET and ET2 are multiples of mean Total and mean square Total respectively. So $X_j$ is computed as covariance of class j and Total divided by standard deviations of class j and Total. According to one embodiment, an algorithm with iterative accumulation of counts upon arrival of new histograms can be implemented. Such algorithm then can be easily seen to be applicable to "on-the-fly" diagnostics as opposed to posterior diagnostics.

Figure 5:
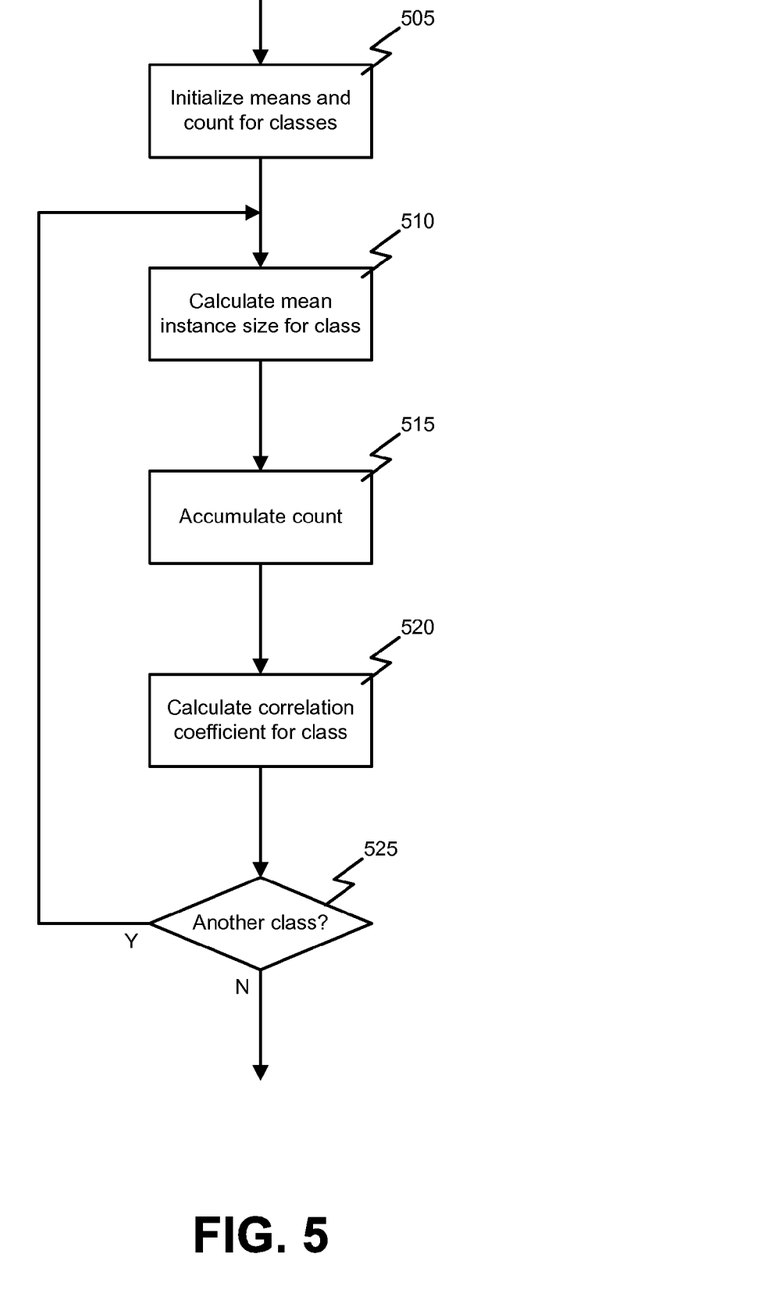
FIG. 5 is a flowchart illustrating a process for calculation of a correlation coefficient according to one embodiment of the present invention.

FIG. 5 is a flowchart illustrating a process for calculation of a correlation coefficient according to one embodiment of the present invention. In this example, the process can begin with initializing 505 mean instance size and instance count values for each class. The mean instance size for a class can be calculated 510 and the instance count for each class can be accumulated 515. The correlation coefficient can be calculated 520 for the class based on the mean instance size of the class, the instance count and a total size of the heap. A determination 525 can be made as to whether additional classes are represented by instances in the heap. If 525 additional classes are represented, processing can be repeated to calculate 510 the mean instance size for another class, accumulate 515 the instance count for the class and calculate 520 the correlation coefficient for each class represented in the heap.

Thus, the methods and systems described herein provide for sorting the growing objects by the similarity of their trend to the trend of the total memory consumption. If the memory consumption of the software program is growing, the closest trends can be those of the objects that appear to be leaking, and the trends of the objects whose memory footprint stabilizes, can be dissimilar to the trend of the total memory consumption, when the memory leak is present. This allows for focusing the investigation on the objects whose trend is very similar to that of the total memory consumption, but whose instance counts are very low, because this means a small number of allocation code paths to investigate.

Embodiments described here provide for detection of memory leak problems as they occur. That is, it is not necessary to wait for the program to reach a point close to the failure to allocate any more memory. It is possible to implement embodiments described herein as a standalone analyzer software, or embed it into a program or apparatus as part of its self-diagnostic mechanism.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for detecting a memory leak, the method comprising:
   collecting instance count data for a number of instances of a plurality of classes in a memory heap;
   calculating a correlation coefficient for each of the plurality of classes in the memory heap, the correlation coefficient representing a relevance of the class to a growth of the memory heap and wherein calculating the correlation coefficient comprises initializing mean instance size and instance count values for each class, calculating the mean instance size for each class, and accumulating the instance count for each class; and
   identifying classes contributing to the growth of the memory heap based on the correlation coefficient.

2. The method of claim 1, wherein collecting instance count data for the instances of the plurality of classes comprises collecting class histograms for each of the plurality of classes.

3. The method of claim 2, wherein the class histograms comprise a list of names of the classes of the plurality of classes, counts of instances of each class, cumulative memory size used by each of the classes, and total memory used.

4. The method of claim 1, further comprising calculating the correlation coefficient for each class based on the mean instance size of each class, the instance count and a total size of the heap.

5. The method of claim 1, wherein the correlation coefficient of each class has a value between −1.0 and +1.0.

6. The method of claim 5, wherein identifying classes contributing to the growth of the memory heap comprises identifying those classes having a correlation coefficient of approximately +1.0.

7. The method of claim 3, wherein collecting instance count data for the instances of the plurality of classes in the memory heap comprises collecting three or more class histograms for each class dynamically during execution of an application creating the instances.

8. A system comprising:
a processor; and
a memory communicatively couple with and readable by the processor and having stored therein a series of instructions which, when executed by the processor, cause the processor to detect a memory leak by collecting instance count data for a number of instances of a plurality of classes in a memory heap, calculating a correlation coefficient for each of the plurality of classes in the memory heap, the correlation coefficient representing a relevance of the class to a growth of the memory heap and wherein calculating the correlation coefficient comprises initializing mean instance size and instance count values for each class, calculating the mean instance size for each class, and accumulating the instance count for each class, and identifying classes contributing to the growth of the memory heap based on the correlation coefficient.

9. The system of claim 8, wherein collecting instance count data for the instances of the plurality of classes comprises collecting class histograms for each of the plurality of classes.

10. The system of claim 9, wherein the class histograms comprise a list of names of the classes of the plurality of classes, counts of instances of each class, cumulative memory size used by each of the classes, and total memory used.

11. The system of claim 8, further comprising calculating the correlation coefficient for each class based on the mean instance size of each class, the instance count and a total size of the heap.

12. The system of claim 8, wherein the correlation coefficient of each class has a value between −1.0 and +1.0.

13. The system of claim 12, wherein identifying classes contributing to the growth of the memory heap comprises identifying those classes having a correlation coefficient of approximately +1.0.

14. The system of claim 10, wherein collecting instance count data for the instances of the plurality of classes in the memory heap comprises collecting three or more class histograms for each class dynamically during execution of an application creating the instances.

15. A machine-readable hardware storage device comprising a series of instructions stored thereon which, when executed by a processor, cause the processor to detect a memory leak by:
collecting instance count data for a number of instances of a plurality of classes in a memory heap;
calculating a correlation coefficient for each of the plurality of classes in the memory heap, the correlation coefficient representing a relevance of the class to a growth of the memory heap and wherein calculating the correlation coefficient comprises initializing mean instance size and instance count values for each class, calculating the mean instance size for each class, and accumulating the instance count for each class; and
identifying classes contributing to the growth of the memory heap based on the correlation coefficient.

16. The machine-readable hardware storage device of claim 15, wherein collecting instance count data for the instances of the plurality of classes comprises collecting class histograms for each of the plurality of classes.

17. The machine-readable hardware storage device of claim 15, wherein the class histograms comprise a list of names of the classes of the plurality of classes, counts of instances of each class, cumulative memory size used by each of the classes, and total memory used.

18. The machine-readable hardware storage device of claim 15, further comprising calculating the correlation coefficient for each class based on the mean instance size of each class, the instance count and a total size of the heap.

19. The machine-readable hardware storage device of claim 15, wherein the correlation coefficient of each class has a value between −1.0 and +1.0.

20. The machine-readable hardware storage device of claim 19, wherein identifying classes contributing to the growth of the memory heap comprises identifying those classes having a correlation coefficient of approximately +1.0.

21. The machine-readable hardware storage device of claim 17, wherein collecting instance count data for the plurality of classes in the memory heap comprises collecting three or more class histograms for each class dynamically during execution of an application creating the instances.

* * * * *

UNITED STATES PATENT AND TRADEMARK OFFICE
CERTIFICATE OF CORRECTION

| | | |
|---|---|---|
| PATENT NO. | : 8,522,216 B2 | |
| APPLICATION NO. | : 12/773211 | |
| DATED | : August 27, 2013 | |
| INVENTOR(S) | : Otenko | |

It is certified that error appears in the above-identified patent and that said Letters Patent is hereby corrected as shown below:

In the Specification

In column 6, line 16, delete "can be" and insert -- be --, therefor.

In column 10, line 16, delete "Xi." and insert -- Xj. --, therefor.

In the Claims

In column 14, line 33, in Claim 17, delete "claim 15," and insert -- claim 16, --, therefor.

Signed and Sealed this
Thirty-first Day of December, 2013

Margaret A. Focarino
*Commissioner for Patents of the United States Patent and Trademark Office*